United States Patent
Shimoyama et al.

(10) Patent No.: US 8,860,791 B2
(45) Date of Patent: Oct. 14, 2014

(54) STEREOSCOPIC DISPLAY SYSTEM WITH GLASSES INFORMATION

(75) Inventors: Kenichi Shimoyama, Tokyo (JP); Nao Mishima, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 643 days.

(21) Appl. No.: 12/888,554

(22) Filed: Sep. 23, 2010

(65) Prior Publication Data

US 2011/0216175 A1    Sep. 8, 2011

(30) Foreign Application Priority Data

Mar. 5, 2010    (JP) .................................. 2010-049552

(51) Int. Cl.
*H04N 13/04*    (2006.01)

(52) U.S. Cl.
CPC ....... *H04N 13/0497* (2013.01); *H04N 13/0438* (2013.01); *H04N 2213/008* (2013.01)
USPC .......................................................... 348/56

(58) Field of Classification Search
USPC .......................................................... 348/56
See application file for complete search history.

(56) References Cited

U.S. PATENT DOCUMENTS

2010/0194857 A1*    8/2010   Mentz et al. .................... 348/43

FOREIGN PATENT DOCUMENTS

| JP | 10-276456    | 10/1998 |
|----|--------------|---------|
| JP | 2000-78615   | 3/2000  |
| JP | 2004-246725  | 9/2004  |
| JP | 2006-196995  | 7/2006  |
| JP | 2006-262191  | 9/2006  |
| JP | 2011-108702  | 6/2011  |
| JP | 2011-142606  | 7/2011  |

OTHER PUBLICATIONS

Notice of Reasons for Rejection issued by the Japanese Patent Office on Dec. 2, 2011, for Japanese Patent Application No. 2010-049552, and English-language translation thereof.

* cited by examiner

*Primary Examiner* — Richard Torrente
(74) *Attorney, Agent, or Firm* — Finnegan, Henderson, Farabow, Garrett & Dunner, LLP

(57) ABSTRACT

A stereoscopic display device for three-dimensionally displaying a display image to enable a viewer to view the display image using glasses is disclosed. The device includes a receiving unit, a display memory unit, a controller unit, an adjusting unit, and a display unit. The receiving unit receives, form the glasses, glasses information used to identify an attribute of the glasses. The display memory unit stores parameter information corresponding to the received glasses information and used to control a quality of the display image when the display image is displayed. The controller unit generates image control information in accordance with the parameter information. The adjusting unit adjusts the display image based on the image control information to generate an adjusted display image. The display unit displays the adjusted display image.

9 Claims, 6 Drawing Sheets

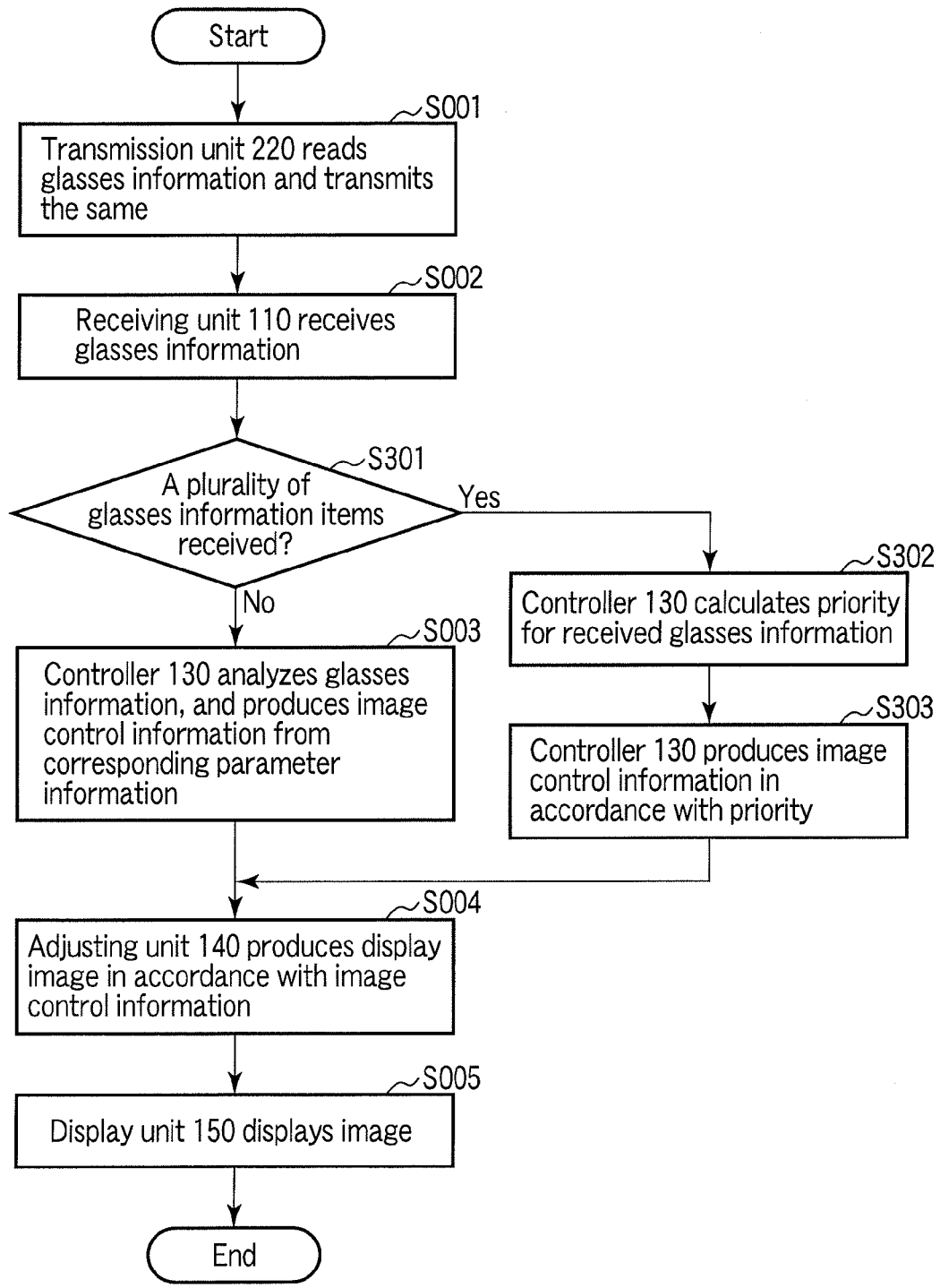
F I G. 3

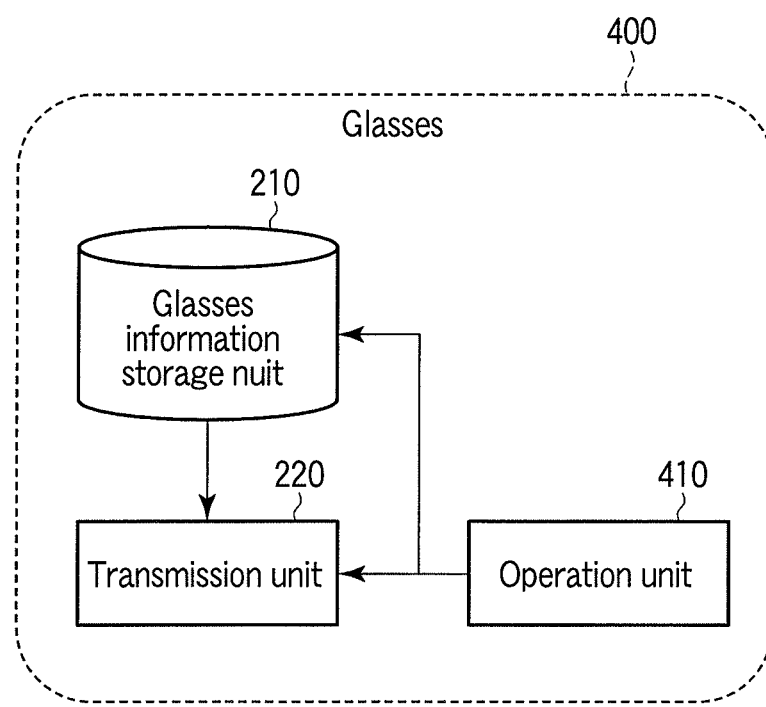
F I G. 4

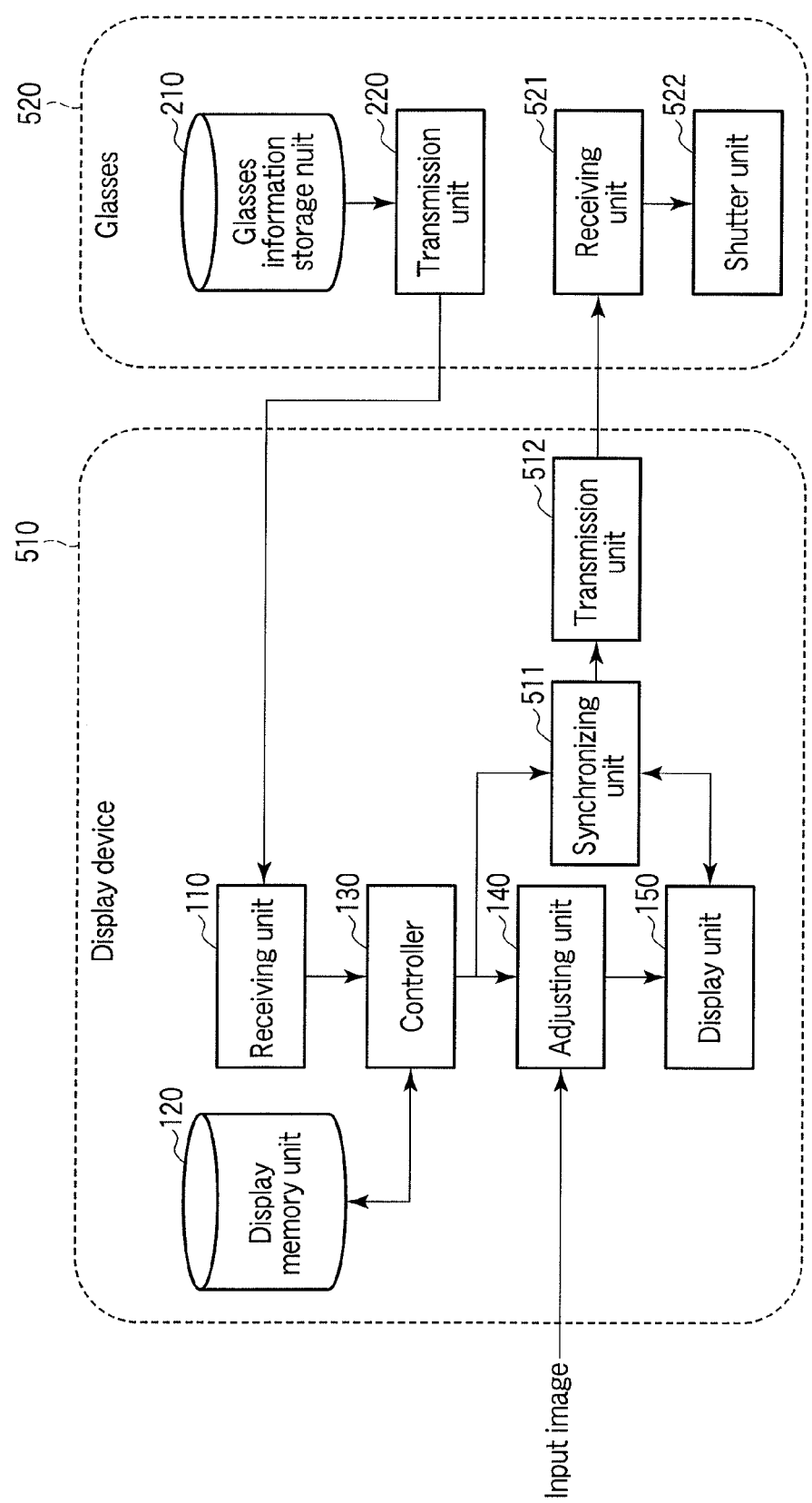
F I G. 5

… (1)

STEREOSCOPIC DISPLAY SYSTEM WITH GLASSES INFORMATION

CROSS-REFERENCE TO RELATED APPLICATIONS

This application is based upon and claims the benefit of priority from Japanese Patent Application No. 2010-049552, filed Mar. 5, 2010; the entire contents of which are incorporated herein by reference.

FIELD

Embodiments described herein relate generally to a display device and system for displaying a three-dimensional image, and glasses for viewing the image.

BACKGROUND

As a scheme for viewing a three-dimensional image, there is known a scheme that utilizes glasses for viewing the image. In this scheme, glasses are used unlike the standard case of viewing a two-dimensional image by the naked eyes. A technique has been proposed to eliminate a feeling of wrongness associated with the differences in brightness, contrast, white balance, etc. between the case of viewing a three-dimensional image through the liquid crystal shutters of glasses and the case of viewing a two-dimensional image by the naked eyes (see, for example, JP-A 10-276456 (KOKAI)). JP-A 10-276456 discloses a technique of correcting the quality of a video image using a two-dimensional video signal and a three-dimensional video signal, thereby enabling an excellent three-dimensional image to be viewed. Further, one of the properties of a three-dimensional image is a stereoscopic effect. A technique of enabling a viewer to manually adjust the stereoscopic effect of a stereoscopic video image has been proposed (see, for example, JP-A 2000-78615 (KOKAI)). JP-A 2000-78615 discloses a technique of adjusting the stereoscopic effect by means of a parallax operation signal externally input using, for example, a remote controller. By virtue of this technique, a stereoscopic video image can be correctly recognized even if the size of a display screen supposed during photographing differs from that of the actual display screen.

In general, when viewers view a three-dimensional image, they may feel it very differently, compared to a two-dimensional image. Accordingly, it is important to adjust the three-dimensional image in accordance with the feelings of the viewers. The above-mentioned prior art techniques do not consider this point. In these techniques, it is necessary for each viewer to execute adjustment whenever they wish, which is very inconvenient and troublesome to them.

BRIEF DESCRIPTION OF THE DRAWINGS

FIG. 3 is a flowchart useful in explaining the operation of a stereoscopic display system according to a second embodiment;

FIG. 4 is a block diagram illustrating the structure of glasses according to a third embodiment;

FIG. 5 is a block diagram illustrating a stereoscopic display system according to a fourth embodiment.

DETAILED DESCRIPTION

In general, according to one embodiment, a stereoscopic display device is for three-dimensionally displaying a display image to enable a viewer to view the display image by means of glasses. The device includes a receiving unit, a display memory unit, a controller unit, an adjusting unit, and a display unit. The receiving unit receives, from the glasses, glasses information used to identify an attribute of the glasses. The display memory unit stores parameter information corresponding to the received glasses information and used to control a quality of the display image when the display image is displayed. The controller unit generates image control information in accordance with the parameter information. The adjusting unit adjusts the display image based on the image control information to generate an adjusted display image. The display unit displays the adjusted display image.

Embodiments will be described. In the embodiments, like reference numbers denote like elements, and no duplicate explanation will be made.

First Embodiment

In a stereoscopic display system according to a first embodiment, stereoscopic display is realized by means of glasses. The stereoscopic display scheme using the glasses, employed in this system, may be a time division scheme, a space separation scheme, etc.

Figure 1:
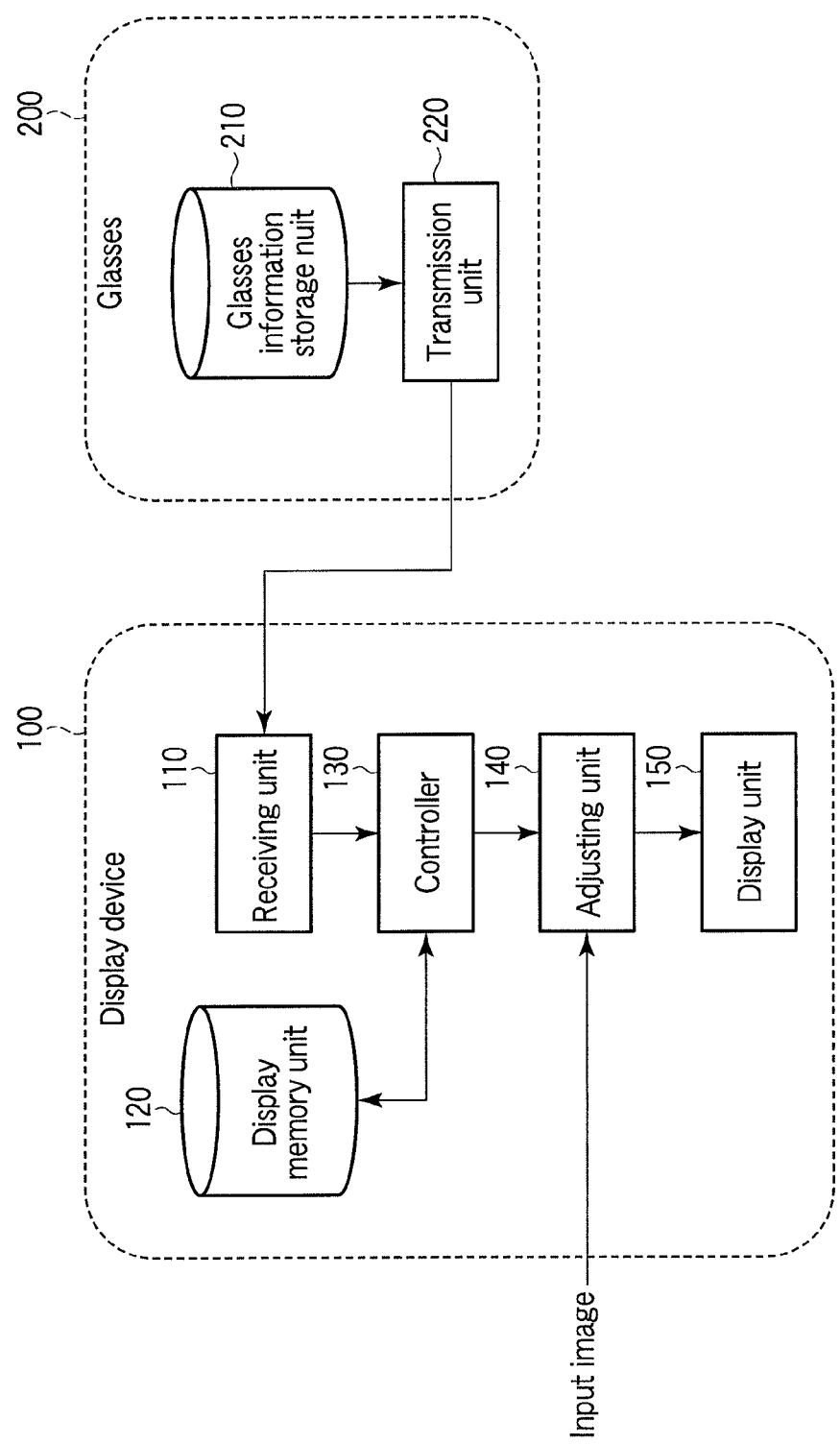
FIG. 1 is a block diagram illustrating a stereoscopic display system according to a first embodiment.

FIG. 1 shows the stereoscopic display system of the first embodiment. As shown, the stereoscopic display system comprises a display device 100 for displaying a three-dimensional image, and glasses 200 that enable a viewer to stereoscopically view the image displayed on the display device 100. It is preferable that the stereoscopic display scheme of the display device 100 should correspond to that of the glasses 200.

For instance, there is an example of the time division scheme, in which images for each of the right and left eyes are displayed every second frame. In this case, it is preferable that the glasses 200 should be constructed so that the images for the right and left eyes are separated in synchronism with the display of the images. To this end, it is possible that the glasses 200 are of a shutter scheme. The glasses 200 of the shutter scheme have respective shutter functions. By turning on and off the shutters (not shown), the images to be displayed for the right and left eyes of the viewer can be separated. The stereoscopic display system of the first embodiment may employ a field sequential scheme or a frame sequential scheme.

Further, there is an example of the space division scheme, in which images for each of the right and left eyes are displayed every vertical or horizontal second line on the display screen. In this case, polarizing filters (not shown) having different polarizing directions are attached to the display screen in accordance with the positions of images for the right and left eyes. Similarly, polarizing filters (not shown) having corresponding polarizing directions are attached to the right and left glasses 200 to separate the images to be guided to the right and left eyes of the viewer. Alternatively, the anaglyph scheme or concentration difference scheme may be employed. Also in these cases, the scheme of the glasses should be made to correspond to that of the display device.

The first embodiment employs a scheme of executing stereoscopic display using glasses of the time division scheme.

The glasses 200 comprise a glasses information storage unit 210 for storing glasses information used to identify the attributes of the glasses 200, and a transmission unit 220 for transmitting the glasses information to the display device 100.

The glasses information storage unit 210 stores glasses information for identifying the attributes of the glasses 200. It is not always necessary to discriminate a pair of glasses from any other pair of glasses. It is sufficient if attributes for each purpose of use can be discriminated. Various types of glasses information are possible to indicate the attributes of glasses. For instance, the following information items may be employed:

(1-1) ID number unique to glasses;
(1-2) Ambient information such as the brightness of a room during viewing or the viewing time;
(1-3) Content information such as the category of content to view;
(1-4) Physical information on a viewer, such as age, sex, eyesight;
(1-5) Image quality taste information such as image quality desired by the viewer (brighter, darker, sharper);
(1-6) Content taste information such as the category of content desired by the viewer;
(1-7) Viewer mentality information such as happy or sad;
(1-8) Attitude information such as the attitude (lying, sitting) of the viewer during viewing; and
(1-9) Information indicating whether the glasses 200 are adult or child ones The glasses information storage unit 210 holds one or more of the above glasses information items, according to need.

The display device 100 comprises a receiving unit 110 for receiving glasses information from the transmission unit 220, a display memory unit 120 for storing parameter information used to control the quality of an input image displayed, a controller 130 for generating image control information in accordance with parameter information corresponding to the glasses information received by the receiving unit 110, an adjusting unit 140 for adjusting the input image based on the image control information to generate a display image, and a display unit 150 for displaying the display image.

The input image may be an image input by any device or medium. For instance, it may be input via a recording medium such as an HDD, by an external device connected via a network, or via a broadcasting wave for a TV set. Further, the input image may be a stereoscopic image or a standard two-dimensional image. Yet further, a stereoscopic image generated from a two-dimensional image can be used as the input image.

The receiving unit 110 receives glasses information from the transmission unit 220. At this time, any generally known communication method can be employed. For instance, wired communication is possible. However, this requires a cable, and therefore, wireless communication is preferable.

The display memory unit 120 holds parameter information for controlling the image quality. The following parameters can be used to control the image quality:

(2-1) Parameters, such as brightness, contrast, color strength, hue, that can be used in common for two-dimensional images and three-dimensional images;
(2-2) Parameters unique to the three-dimensional images, such as a parallax, an amount of perceivable protrusion, and a stereoscopic effect; and
(2-3) Parameters used to select an input image, such as an external terminal input, a TV broadcasting wave, and a channel selected by a tuner Parameter information other than the above may be held to control the image quality. These parameter information items are stored in association with the glasses information items. Other recommendable parameter information, which does not correspond to the glasses information, may additionally be stored.

The controller 130 analyzes the glasses information received by the receiving unit 110, and reads, from the display memory unit 120, parameter information corresponding to the result of the analysis to generate image control information. For instance, when the glasses information ID indicates an ID unique to the glasses 200, parameter information stored in association with the same is read and used as the image control information. In this case, it is preferable that a parameter reflecting a viewer's taste be set as the parameter information.

For example, when glasses information indicating that the viewer is an adult or child, the parameter information corresponding to the received glasses information is read and used as the image control information. In general, the distance between the eyes of a child is shorter than that of an adult. Because of this, parameter information in which the parallax is set to a lower value than in the case of adults is set for children. This enables a child to view a stereoscopic video image in a state free from eyestrain. Further, if there is no parameter information corresponding to the received glasses information, the aforementioned recommendable parameter information beforehand prepared is used as the image control information.

The adjusting unit 140 adjusts an image input by the image input unit to generate a display image, using the image control information generated by the controller 130. If the image control information contains a parameter for input image selection, or a parameter to instruct the adjusting unit 140 to, for example, switch the display mode between two-dimensional image display and three-dimensional image display, the adjusting unit 140 executes corresponding input image switching. After that, if the image control information contains information related to the image quality, such as brightness, contrast, color strength, hue, parallax, and the range of stereoscopic expression, the adjusting unit 140 executes corresponding image quality adjustment. At this time, image quality adjustment unique to three-dimensional images, e.g., adjustment of the amount of perceivable protrusion, may be executed by a known method. For instance, to increase the amount of perceivable protrusion, if the image for the left eye is shifted to the right and the image for the right eye is shifted to the left, the entire image is seen as if it approaches the viewer. In contrast, to reduce the amount of perceivable protrusion, if the image for the left eye is shifted to the left and the image for the right eye is shifted to the right, the entire image is seen as if it is away from the viewer. It is a matter of course that methods other than the above may be employed to execute image quality adjustment unique to three-dimensional images, e.g., adjustment of the amount of perceivable protrusion.

The display unit 150 displays the display image adjusted by the adjusting unit 140. A description will now be given of a liquid crystal display as an example of the display unit 150. However, the display unit 150 is not limited to this, but may be a plasma display or projector. Further, the display unit 150 may also be able to display two-dimensional images.

Figure 2:
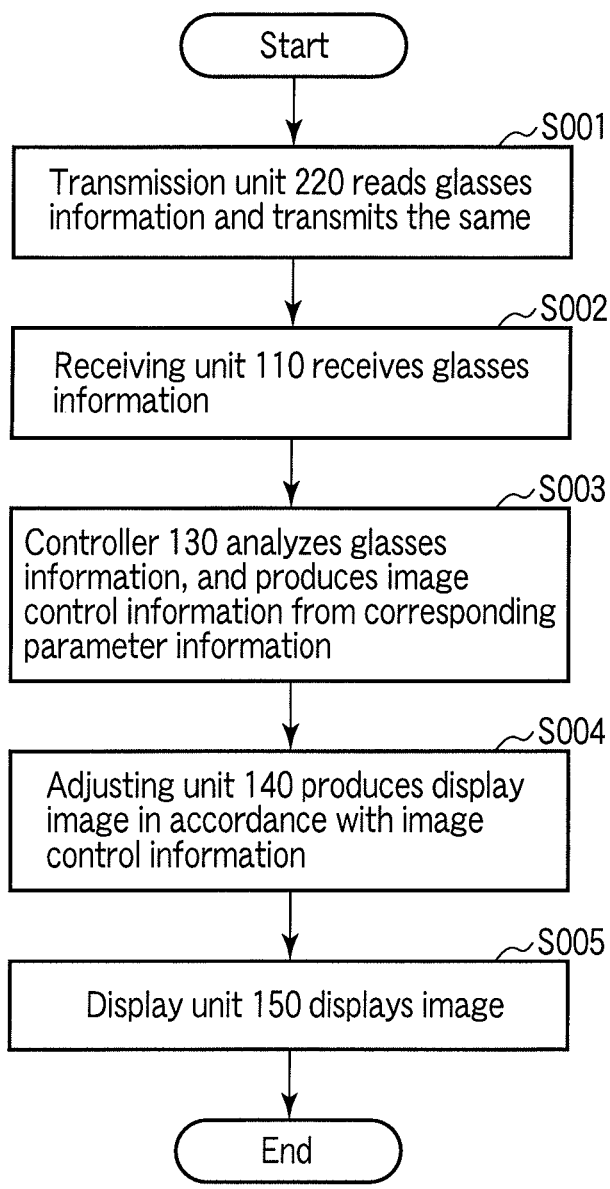
FIG. 2 is a flowchart useful in explaining an operation of the stereoscopic display system according to the first embodiment.

FIG. 2 is a flowchart useful in explaining the operation of the stereoscopic display system of the first embodiment.

The transmission unit 220 reads glasses information from the glasses information storage unit 210, and transmits the same to the stereoscopic display device 100 (S001). The receiving unit 110 receives the glasses information (S002). The controller 130 analyzes the glasses information, and reads parameter information corresponding thereto from the display memory unit 120 to generate image control information (S003). The adjusting unit 140 generates a display image corresponding to the image control information (S004). The display unit 150 displays the image (S005).

(Modification 1)

Means for enabling a viewer to operate parameter information may be employed, although it is not shown. Through this means, an operation of changing the stored information, such as the parameter information, is executed by, for example, an external input. Various operation methods can be used.

For instance, the operation methods include the following:

(1) The glasses incorporate switches for selecting parameter information;

(2) Parameter information is input via, for example, a remote controller;

(3) Parameter information is input via, for example, a PC connected to the display device;

(4) Parameter information is input by an input to the display device; and (5) Parameter information is input via an external memory directly inserted into the display device.

The methods are not limited to the above, but may include any other appropriate operation methods.

Second Embodiment

A stereoscopic display system according to a second embodiment differs from the stereoscopic display system of FIG. 2 in the operation executed when glasses information is transmitted by a plurality of pairs of glasses 200. When a plurality of glasses information items are received, a plurality of parameter information items are used. In this case, the parameter information items cannot be directly used as the image control information. In light of this, the display memory unit 120 holds priority information for calculating the priority of each of the parameter and glasses information items. The controller 130 calculates the priority of each of the glasses information items received by the receiving unit 110, based on the priority information. The controller 130 also calculates image control information based on the parameter information corresponding to each glasses information item, and the calculated priority.

The priority information held by the display memory unit 120 is associated with the rule under which it is determined to which ones of a plurality of glasses information items higher priority should be given. For instance, a rule is possible which defines that the glasses information having a lower ID number has a higher priority. A rule that regards safety related to eyestrain as important may be employed. In this case, for example, higher priority is given to children, old people, and people of a poor eyesight than to adults, young people, and people of a good eyesight, respectively. Any other appropriate rules may be employed instead of the above.

FIG. 3 shows the operation of the stereoscopic display system of the second embodiment.

The controller 130 determines whether the receiving unit 110 has received a plurality of glasses information items (S301). If a plurality of glasses information items are received (S301, Yes), the controller 130 calculates degrees of priority corresponding to the plurality of glasses information items, based on priority information. The degrees of priority may be expressed as, for example, certain numerical values, or as ranks indicating the order of the glasses information items.

The controller 130 calculates image control information using parameter information and priority information corresponding to the glasses information items (S303). More specifically, parameter information is synthesized or selected in accordance with priority information, and the resultant parameter information is used as the image control information. Various methods are possible for synthesizing the image control information from the parameter information based on the priority information. For instance, the following can be employed:

(3-1) Parameter information corresponding to glasses information of the highest priority is selected;

(3-2) The average of all parameter information corresponding to the glasses information is used;

(3-3) The weighted average, based on the priority information, of all parameter information corresponding to the glasses information is used;

(3-4) The median of all parameter information corresponding to the glasses information is used;

(3-5) The weighted median of all parameter information corresponding to the glasses information is used;

(3-6) The mode value of all parameter information corresponding to the glasses information is used;

(3-7) A recommended parameter is set beforehand, and one of all parameter information items corresponding to the glasses information items, which one parameter information is closest to the recommended parameter, is used;

(3-8) One of the parameter information items, which was used latest for viewing, is used; and (3-9) One of the parameter information items, which was used earliest for viewing, is used.

Methods other than the above may be employed. Further, the same adjusting method or different adjusting methods may be used for different elements included in the parameter information, such as "brightness," "contrast" and "stereoscopic effect."

When the priority information is not used for synthesizing the parameter information as in the cases (3-2) and (3-4) to (3-9), the operation at step S302 may be skipped. When glasses information is received from a plurality of pairs of glasses 200, parameter information corresponding to the received glasses information is synthesized to generate image control information. In this case, the display memory unit 120 does not always have to hold the priority information.

Third Embodiment

Glasses 400 employed in a third embodiment differ from the glasses 200 of FIG. 1 in that the glasses information corresponding to the former glasses can be operated by a viewer.

FIG. 4 shows the glasses 400 of the third embodiment.

An operation unit 410 is operated to change glasses information by an external input made by the operation of the viewer. Various operation methods are possible. For instance, the following may be employed:

(4-1) A switch is incorporated in the glasses, and parameter information is selected by switching the switch;

(4-2) Parameter information is input to the glasses via, for example, a remote controller; and (4-3) The glasses are connected to, for example, a PC and receives parameter information therefrom.

The operation methods are not limited to the above, and various other appropriate methods can be employed. The operation unit 410 may newly input information to the glasses information storage unit 210. Further, the operation unit 410 may select information to be sent to the transmission unit 220 from a plurality of glasses information items beforehand stored in the glasses information storage unit 210. For instance, by storing a plurality of IDs as the glasses information in the glasses information storage unit 210, and switching the switch incorporated in the glasses, troublesome operations involved when the glasses 400 are used in common by a plurality of viewers can be reduced.

Fourth Embodiment

A fourth embodiment is directed to glasses whose transmittance is controllable. In the fourth embodiment, time-divisional shutter type glasses are employed as examples. However, the embodiment is not limited to this.

FIG. 5 shows a stereoscopic display system according to the fourth embodiment.

A display device 510 further comprises a synchronizing unit 511 and a transmission unit 512.

The synchronizing unit 511 generates a switching signal to synchronize the opening/closing of the shutters (not shown) of a pair of glasses 520 with display of data on the display unit 150. The transmission unit 512 supplies the glasses 520 with a switching signal that indicates the opening/closing of the shutters of the glasses 520, and with, when necessary, a signal for designating the transmittance of the shutters. These signals are of, for example, infrared signals. As a communication method therebetween, the transmission unit 512 may use a generally known method. Wired communication, for example, is possible. However, this method requires a cable and is therefore troublesome. Accordingly, wireless communication is preferable.

The pair of glasses 520 comprise a receiving unit 521 for receiving a switching signal form the transmission unit 512, and a shutter unit 522 that can open and close the right and left shutters. The transmission unit 220 may be constructed such that it transmits glasses information after detecting the use of the glasses 520. The use of the glasses 520 may be detected by detecting, for example, the on and off states of the switch of the glasses 520.

The shutter unit 522 changes the transmittance of the shutters in accordance with reception of a switching signal. Further, when receiving a signal designating a transmittance, the shutter unit 522 changes the transmittance of the shutters to the designated one.

The glasses information storage unit 210 stores glasses information that identifies the glasses 520.

The transmission unit 220 transmits the glasses information.

The display memory unit 120 may hold the following parameter information for controlling the shutter type glasses 520:

(5-1) A parameter for mode switching, such as switching of two-dimensional image display to three-dimensional image display;

(5-2) A parameter for turning off the screen; and (5-3) A parameter for controlling the transmittance of the glasses By virtue of this control, children can be prevented from viewing content considered harmful to them by, for example, setting the transmittance of the glasses for the children to 0.

Fifth Embodiment

A stereoscopic display system according to a fifth embodiment differs from the systems of the other embodiments in that the former system provides viewers with glasses information and parameter information currently used for image adjustment. In the fifth embodiment, a description will be given of a method of displaying the information on a display unit. However, a method of providing dedicated external display means is also possible. Any other appropriate methods may be employed to display the information to confirm it.

Figure 6:
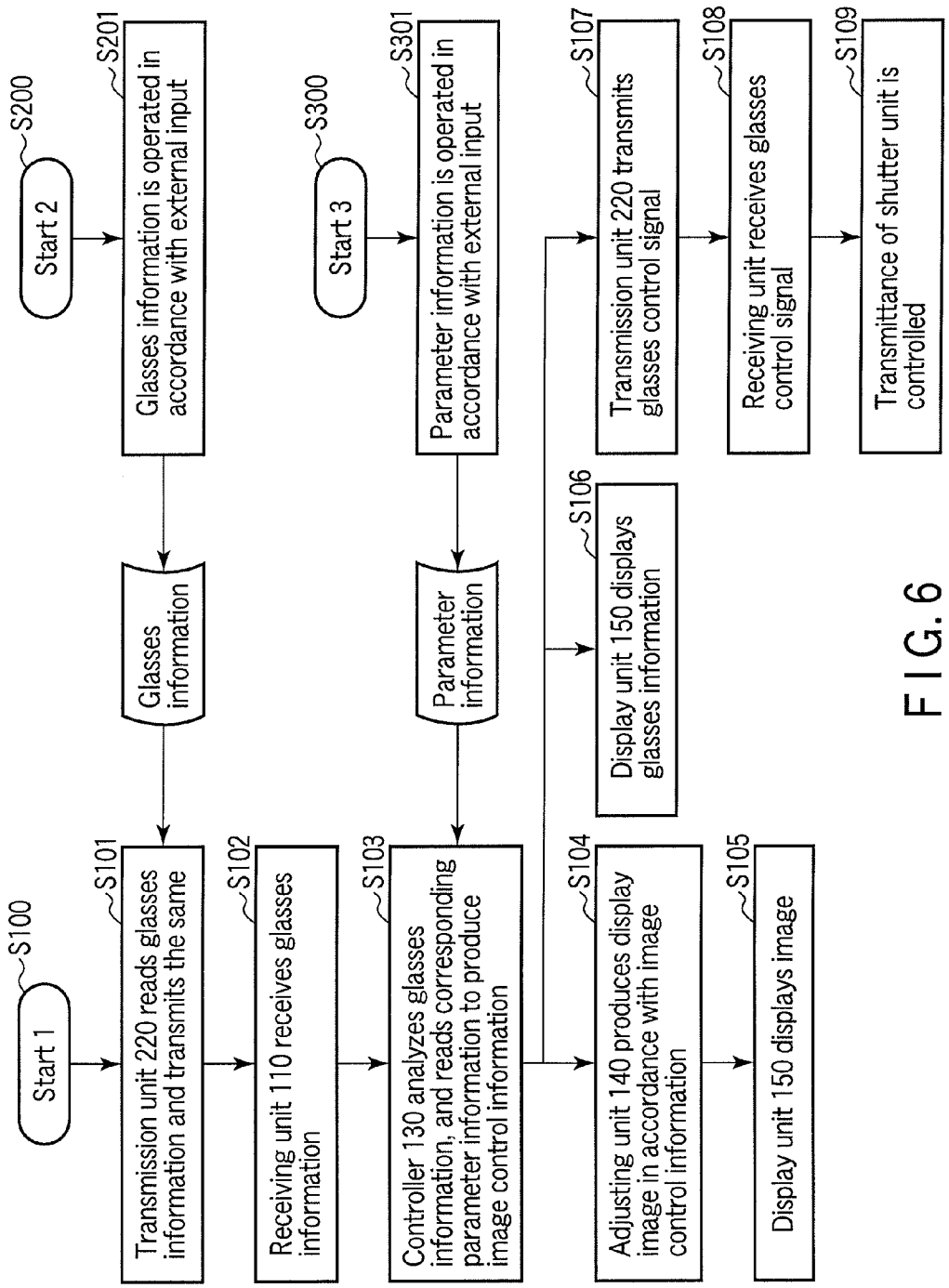
FIG. 6 is a flowchart useful in explaining the operation of a stereoscopic display system according to a fifth embodiment.

FIG. 6 shows the operation of the stereoscopic display system of the fifth embodiment.

At step S101, the transmission unit 220 detects the use of the glasses, and reads the glasses information from the glasses information storage unit 210. At step S102, the receiving unit 110 receives the glasses information. At step S103, the controller 130 analyzes the glasses information, and reads corresponding parameter information from the display memory unit 120 to generate image control information. At step S104, the adjusting unit 140 generates a display image in accordance with the image control information. At step S105, the display unit 150 displays the display image. At step S106, the display unit 150 displays the glasses information. At step S107, the transmission unit 512 transmits a glasses control signal. At step S108, the receiving unit 521 receives the glasses control signal. At step S109, the shutter unit 522 controls the transmittance of the glasses.

When the operation of the stereoscopic display system is started at step S200, the operation unit 410 operates glasses information, stored in the glasses information storage unit 210, in accordance with, for example, an external input (S201).

When the operation of the stereoscopic display system is started at step S300, the operation unit 410 operates parameter information, stored in the display memory unit 120, in accordance with, for example, an external input (S301).

The stereoscopic display systems according to the above-described embodiments enable viewers to easily recognize by their eyes under what conditions the parameters are adjusted, where the viewers simultaneously view displayed images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic display device for three-dimensionally displaying a display image to enable viewers to view the display image by means of glasses, comprising:
    a receiving unit configured to receive, from the glasses, glasses information items used to identify an attribute of the glasses;
    a display memory unit configured to store parameter information items corresponding to the received glasses information items and used to control a quality of the display image when the display image is displayed, wherein each of the parameter information items includes at least one of a parallax, an amount of perceivable protrusion, and a stereoscopic effect;
    a controller unit configured to generate image control information items in accordance with the parameter information items;
    an adjusting unit configured to adjust the display image based on the image control information items to generate an adjusted display image; and a display unit configured to display the adjusted display image, wherein the display memory unit is configured to store the parameter information items in association with the glasses information items;

the receiving unit is configured to receive a plurality of glasses information items from pairs of glasses;

the display memory unit is configured to further store a plurality of priority information items used to calculate priority levels for the received glasses information items, each priority information item indicating an ID number of the corresponding glass information item or an eyesight condition of the corresponding viewer; and when the receiving unit receives the glasses information items, the controller unit is configured to calculate priority levels for the received glasses information items based on the priority information items, and to generate the image control information items based on one of the parameter information items corresponding to one of the received glasses information items that has a highest priority level.

2. The device according to claim 1, wherein the receiving unit is configured to receive a plurality of glasses information items from pairs of glasses;

the display memory unit is configured to further store a plurality of priority information items used to calculate priority levels for the received glasses information items; and when the receiving unit receives the glasses information items, the controller is configured to calculate priority levels for the received glasses information items based on the priority information items, and to synthesize the parameter information items corresponding to the received glasses information items in accordance with the priority information items to generate the image control information items.

3. The device according to claim 2, wherein the parameter information items each include at least one of a parallax, an amount of perceivable protrusion, and a stereoscopic effect.

4. The device according to claim 1, wherein the controller causes the display unit to display the glasses information items and/or the parameter information items used to adjust the display image.

5. Glasses for separating an image on the display device according to claim 1 into images corresponding to right and left eyes of a viewer, comprising:

a glasses information storage unit configured to store glasses information items used to identify the glasses; and a transmission unit configured to transmit the glasses information items to the display device.

6. The glasses according to claim 5, wherein the glasses information storage unit stores a plurality of glasses information items, and further comprising an operation unit configured to operate to select one of the glasses information items to be transmitted from the transmission unit.

7. A stereoscopic display device for three-dimensionally displaying a display image to enable viewers to view the display image by means of glasses, comprising:

a receiving unit configured to receive, from the glasses, glasses information items used to identify an attribute of the glasses;

a display memory unit configured to store parameter information items corresponding to the received glasses information items and used to control a quality of the display image when the display image is displayed, wherein each of the parameter information items includes at least one of a parallax, an amount of perceivable protrusion, and a stereoscopic effect;

a controller unit configured to generate image control information items in accordance with the parameter information items;

an adjusting unit configured to adjust the display image based on the image control information items to generate an adjusted display image; and a display unit configured to display the adjusted display image, wherein the display memory unit is configured to store the parameter information items in association with the glasses information items;

the receiving unit is configured to receive a plurality of glasses information items from pairs of glasses;

the display memory unit is configured to further store a plurality of priority information items corresponding to the received glasses information items, each priority information item indicating an ID number of the corresponding glass information item or an eyesight condition of the corresponding viewer; and when the receiving unit receives the glasses information items, the controller unit is configured to synthesize the parameter information items and generate the image control information items.

8. A stereoscopic display system for three-dimensionally displaying a display image on a display device to enable a viewer viewers to view the display image by means of glasses, the glasses comprising:

a glasses information storage unit configured to store glasses information items used to identify the glasses; and a transmission unit configured to transmit the glasses information items to the display device, and the display device comprising:

a receiving unit configured to receive, from the glasses, glasses information items used to identify an attribute of the glasses;

a display memory unit configured to store parameter information corresponding to the received glasses information items and used to control a quality of the display image when the display image is displayed, wherein each of the parameter information items includes at least one of a parallax, an amount of perceivable protrusion, and a stereoscopic effect;

a controller configured to generate image control information items in accordance with the parameter information items;

an adjusting unit configured to adjust the display image based on the image control information items to generate an adjusted display image; and a display unit configured to display the adjusted display image, wherein the display memory unit is configured to store the parameter information items in association with the glasses information items;

the receiving unit is configured to receive a plurality of glasses information items from pairs of glasses;

the display memory unit is configured to further store a plurality of priority information items used to calculate priority levels for the received glasses information items, each priority information item indicating an ID number of the corresponding glass information item or an eyesight condition of the corresponding viewer; and when the receiving unit receives the glasses information items, the controller is configured to calculate priority levels for the received glasses information items based on the priority information items, and to generate the image control information items based on one of the parameter information items corresponding to one of the received glasses information items that has a highest priority level.

9. The system according to claim 8, the glasses further comprising:

a shutter unit configured to change one of transmittance and reflectance of light for each of eyes of the viewer;

a receiver configured to receive a glasses control signal from the display device; and a glasses controller configured to control one of transmittance and reflectance of the shutter unit based on the glasses control signal, the display device further comprising a transmission unit configured to transmit a control signal for controlling one of transmittance and reflectance of the glasses, and the controller is further configured to generate the glasses control signal in accordance with the parameter information items corresponding to the received glasses information items.

\* \* \* \* \*